United States Patent
Feng

(10) Patent No.: US 6,293,044 B1
(45) Date of Patent: Sep. 25, 2001

(54) SWITCHABLE MOSQUITO EXPELLING/ KILLING DEVICE

(75) Inventor: Hsiu-Mei Feng, Taipei Hsien (TW)

(73) Assignee: Long Well Electronics Corp., Taipei (TW)

( * ) Notice: Subject to any disclaimer, the term of this patent is extended or adjusted under 35 U.S.C. 154(b) by 0 days.

(21) Appl. No.: 09/532,552

(22) Filed: Mar. 22, 2000

(51) Int. Cl.[7] .................................................. A01M 13/00
(52) U.S. Cl. ........................ 43/129; 43/132.1; 422/125; 367/139; 340/384.2
(58) Field of Search .............................. 43/107, 124, 125, 43/129, 131, 132.1, 112; 422/122, 125; 367/139; 116/22 A; 340/384.2

(56) References Cited

U.S. PATENT DOCUMENTS

| | | | |
|---|---|---|---|
| 2,690,501 | * | 9/1954 | Laibow ................................. 392/390 |
| 2,733,333 | * | 1/1956 | Peters .................................. 392/390 |
| 2,931,880 | * | 4/1960 | Yaffe ................................... 392/390 |
| 3,873,960 | * | 3/1975 | Gates, Sr. ............................ 367/139 |
| 3,891,962 | * | 6/1975 | White .................................. 367/139 |
| 3,893,106 | * | 7/1975 | Schulein ............................ 340/384.2 |
| 3,931,865 | * | 1/1976 | Levitt .................................. 367/139 |
| 4,284,845 | * | 8/1981 | Belcher ............................. 340/384.2 |
| 4,563,759 | * | 1/1986 | Hayakawa ........................... 367/139 |
| 4,588,874 | * | 5/1986 | Napierski ............................ 392/390 |
| 4,891,904 | * | 1/1990 | Tabita .................................. 43/112 |
| 5,168,654 | * | 12/1992 | Chien .................................. 43/129 |
| 5,257,012 | * | 10/1993 | Metcalf ............................... 116/22 A |
| 5,282,334 | * | 2/1994 | Kimura et al. ....................... 43/125 |
| 5,311,697 | * | 5/1994 | Cavanaugh et al. ................ 43/132.1 |
| 5,407,642 | * | 4/1995 | Lord .................................... 422/122 |
| 5,606,305 | * | 2/1997 | Jan .................................... 340/384.2 |
| 5,644,866 | * | 7/1997 | Katsuda et al. ...................... 43/129 |
| 5,700,430 | * | 12/1997 | Bonnema et al. ................... 422/125 |
| 5,796,914 | * | 8/1998 | Gatzemeyer et al. ............... 392/390 |
| 5,990,783 | * | 11/1999 | Feng ................................. 340/384.2 |

FOREIGN PATENT DOCUMENTS

| | | | |
|---|---|---|---|
| 51-141272-B1 | * | 12/1976 | (JP) . |
| 58-216103-B1 | * | 12/1983 | (JP) . |
| 4-23937-B1 | * | 1/1992 | (JP) . |
| 4-104752-B1 | * | 2/1992 | (JP) . |
| 8-154554-B1 | * | 6/1996 | (JP) . |
| 9-205919-B1 | * | 8/1997 | (JP) . |

* cited by examiner

Primary Examiner—Darren W. Ark
(74) Attorney, Agent, or Firm—Ware, Fressola, Van Der Sluys & Adolphson LLP

(57) ABSTRACT

Switchable mosquito expelling/killing device including a box body having a clip for hanging the box body on a user's body. The box body is disposed with a pushing block, an electric mosquito incense mat insertion hole, gas releasing slots and a switch. An oscillating circuit and a heater fixing seat, an electric heater and a cell for supplying power are disposed in the box body. By means of switching the switch, the mosquito expelling/killing device can be switched between a mosquito expeller using the oscillating circuit to generate a sound wave simulating the sound wave of male mosquitoes for expelling fertilized female mosquitoes and an electric mosquito incense device using the electric heater to heat electric mosquito incense mat for releasing mosquito-killing incense to kill the mosquitoes.

7 Claims, 5 Drawing Sheets

SWITCHABLE MOSQUITO EXPELLING/KILLING DEVICE

BACKGROUND OF THE INVENTION

The present invention relates to a switchable mosquito expelling/killing device which can be switched between a mosquito expeller for expelling mosquitoes and an electric mosquito incense device for killing the mosquitoes. The switchable mosquito expelling/killing device is applicable to various outdoor situations such as camping, mountaineering, etc.

It is known that mosquitoes are harmful insects which bite people and are media of various kinds of infectious diseases such as Japanese encephalitis, dengue fever, malaria, etc. Therefore, it is important to kill the mosquitoes.

In general, the mosquitoes are killed by means of mosquito incense or pesticide. Such measures will result in stimulating odor which is hard to bear. In addition, the above measures are usable indoors. In the case that they are used outdoors, the incense tends to dissipate with wind and the mosquito-killing can be hardly achieved.

In order to improve the stimulating odor produced by the mosquito incense or pesticide, electric mosquito incense device and mosquito expeller have been developed. With respect to the electric mosquito incense device, a heater is used to heat an electric mosquito incense mat so as to release a gas for killing or expelling the mosquitoes. Those mosquitoes which will attack people or animals are female mosquitoes during egg laying period. The female mosquitoes during this period will avoid male mosquitoes. The mosquito expeller employs this principle to generate a sound wave simulating the sound produced by the male mosquitoes and thus expel the female mosquitoes. The above two measures have their intended functions, and therefore one measure is not convertible to the other because of the external environment or factors. For example, in case the electric mosquito incense mat is exhausted and no spare is available, the electric mosquito incense device will become useless.

SUMMARY OF THE INVENTION

It is therefore a primary object of the present invention to provide a switchable mosquito expelling/killing device which has simple structure and can be easily carried.

It is a further object of the present invention to provide the above switchable mosquito expelling/killing device which can be switched between a mosquito expeller and an electric mosquito incense device in accordance with environmental factors.

It is still a further object of the present invention to provide the above switchable mosquito expelling/killing device which is able to protect a user from being bitten by mosquitoes.

According to the above objects, the switchable mosquito expelling/killing device of the present invention includes a box body having a clip for hanging the box body on a user's body. The box body is disposed with a pushing block, an electric mosquito incense mat insertion hole, gas releasing slots and a switch. An oscillating circuit and a heater fixing seat, an electric heater and a cell for supplying power are disposed in the box body. By means of switching the switch, the mosquito expelling/killing device can be switched between a mosquito expeller using the oscillating circuit to generate a sound wave simulating the sound wave of male mosquitoes for expelling fertilized female mosquitoes and an electric mosquito incense device using the electric heater to heat electric mosquito incense mat for releasing mosquito-killing incense to kill the mosquitoes.

The present invention can be best understood through the following description and accompanying drawings wherein:

DETAILED DESCRIPTION OF THE PREFERRED EMBODIMENT

Figure 1:
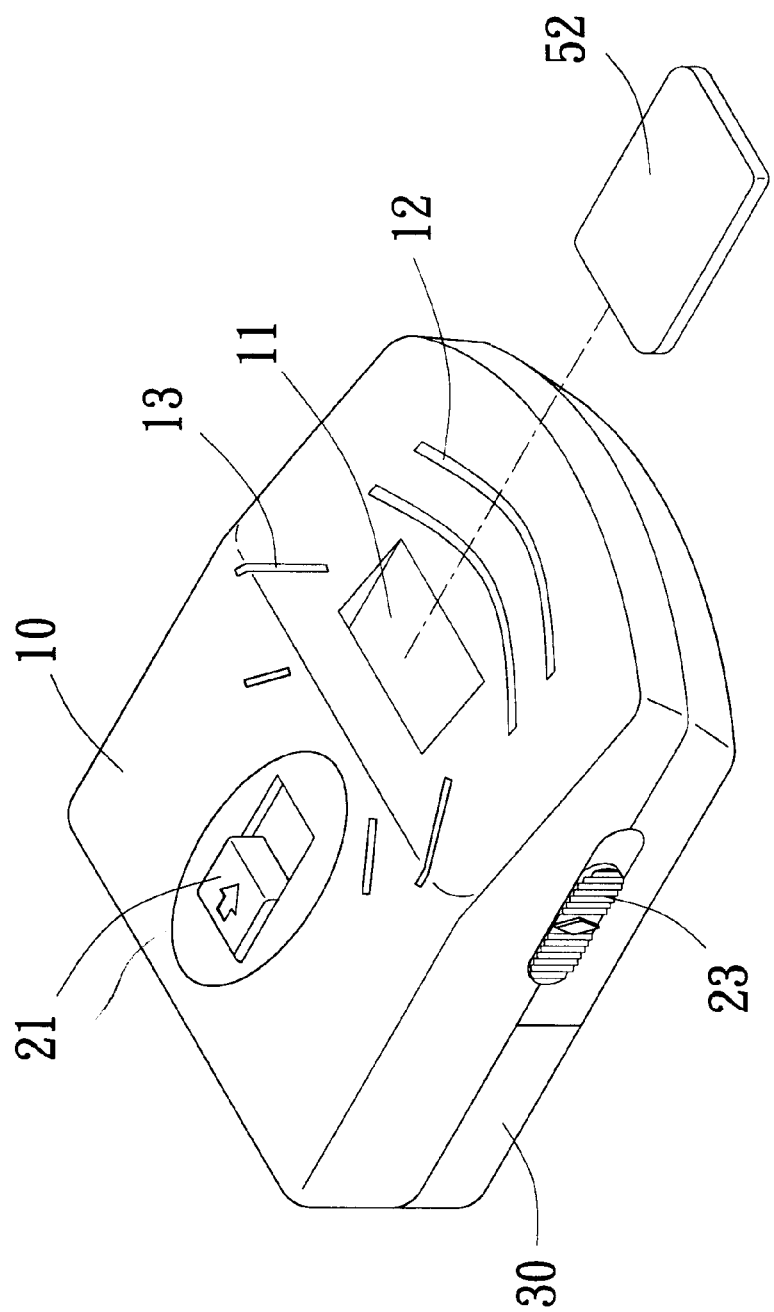
FIG. 1 is a perspective assembled view of the present invention.
Figure 2:
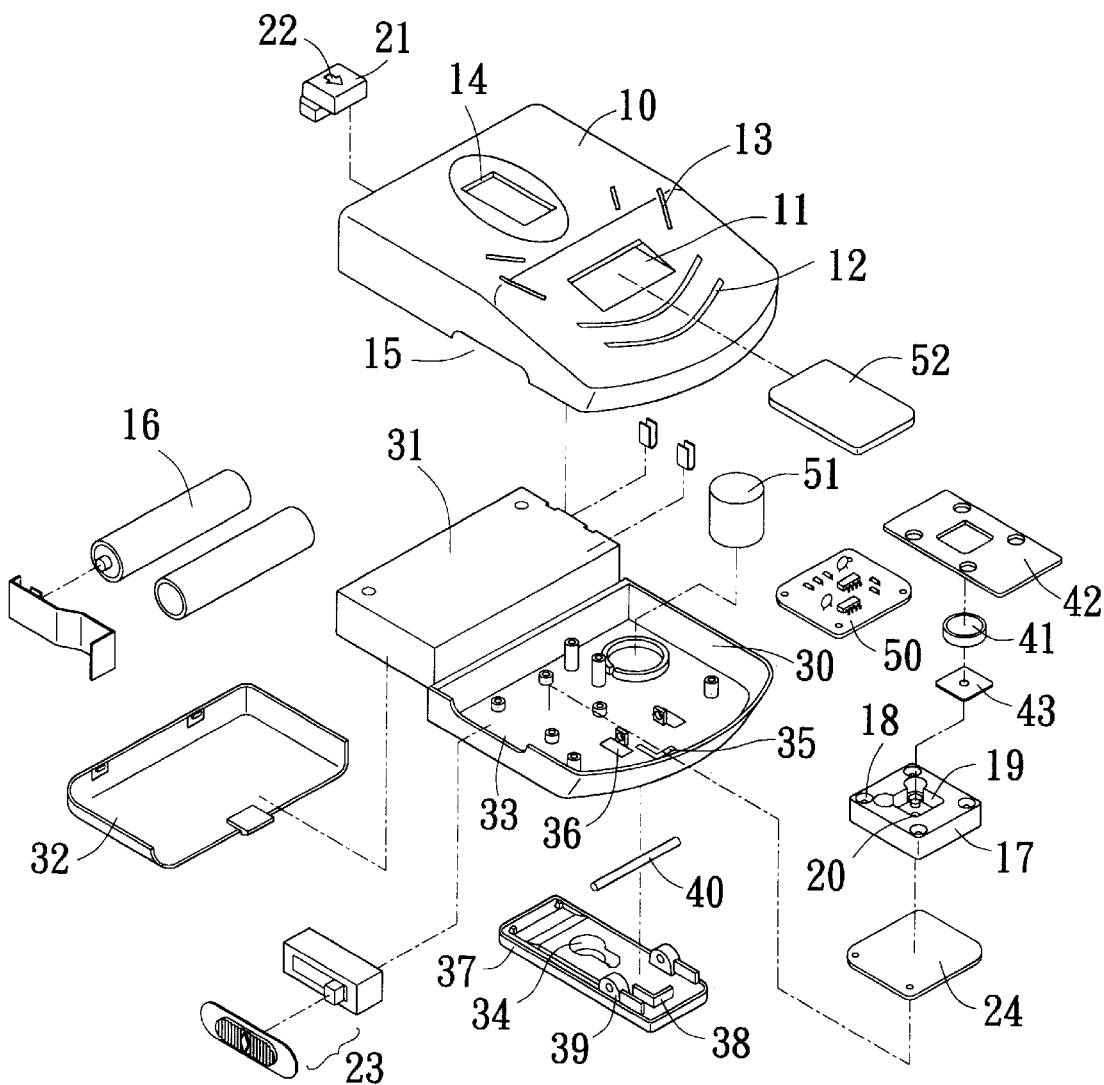
FIG. 2 is a perspective exploded view of the present invention.

Please refer to FIGS. 1 and 2. The present invention includes a box body with a certain size. The front face of the box body is formed with an insertion hole 11 and multiple gas releasing perforations 12, 13. A lateral side of the box body is disposed with a switch 23. The back face of the box body is equipped with a back clip 37. An oscillating circuit 50 and an electric heater 41 are mounted in the box body.

The box body is formed by an upper casing 10 and a bottom casing 30 mated with each other. The surface of the upper casing 10 is formed with a slope section extending from middle portion to the bottom edge. The bottom edge of the slope section is formed with two elongated arched gas releasing slots 12. An insertion hole 11 is formed on the upper side of the gas releasing slots 12. The lateral sides of the insertion hole 11 are additionally formed with multiple shorter gas releasing perforations 13. The center of the upper half of the upper casing 10 is formed with a mat pushing hole 14 perpendicular to the insertion hole 11. A pushing block 21 having an index mark 22 is slidably disposed in the mat pushing hole 14. The top side of the upper casing is disposed with two flanges (not shown) for engaging with a cell cover 32. A lateral side of the upper casing is formed with a switch hole 15 in which the switch 23 is disposed. Four inner corners of the upper casing are respectively disposed with four thread posts with a certain length.

The upper half of the bottom casing 30 is formed with a cell chamber 31 in which a cell 16 is placed. The middle lower edge of the lower half of the bottom casing 30 is formed with an insertion slot 35 and a shaft hole 36, whereby a back clip 37 having an engaging hole 34, an insertion block 38 and a lug block 39 is pivotally connected to the back face of the bottom casing 30 via a shaft pin 40. A lateral side of the bottom casing is formed with a switch hole 33. In addition the four corners of the bottom casing 30 are disposed with threaded holes and threaded posts. The center of the bottom casing is additionally disposed with several thread posts and projecting posts for locking with a heater fixing seat 17 and the upper casing 10. Preferably, the heater fixing seat 17 is made of bakelkite.

Figure 3:
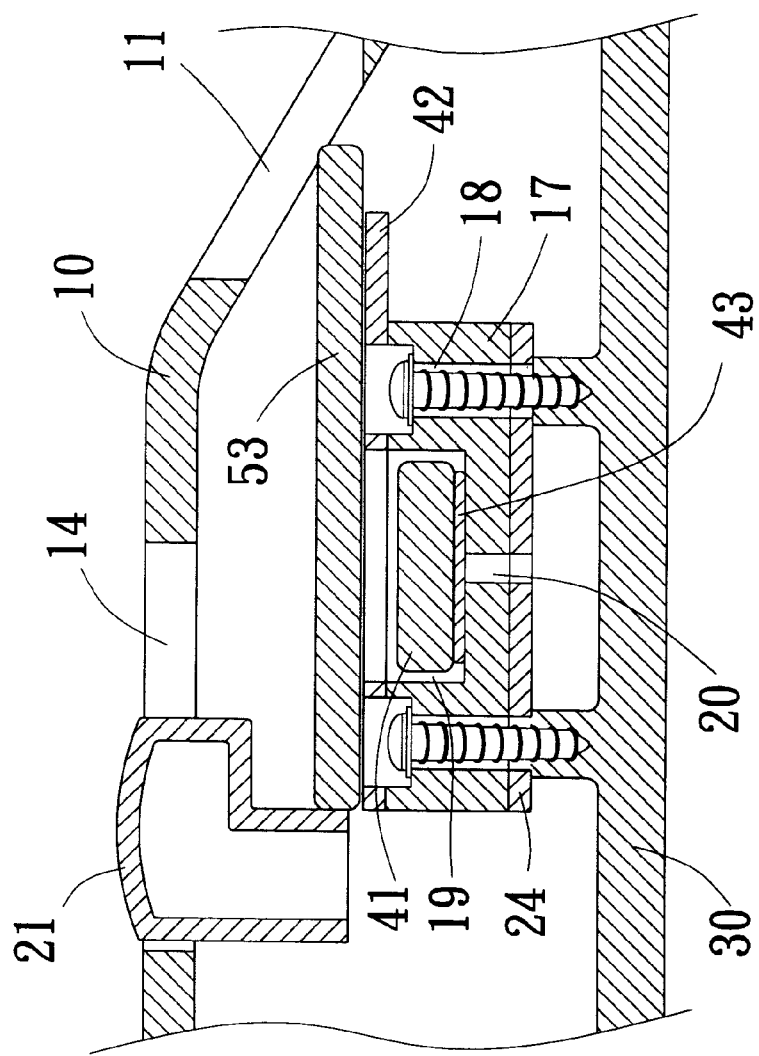
FIG. 3 is a sectional view of a part of the present invention.

Referring to FIG. 3, the heat fixing seat 17 is a rectangular body. The center of the body is formed with a cavity 19 and the four corners of the body are disposed with threaded holes 18. A through hole 20 is formed in the cavity 19 for a central projecting post of the bottom casing 30 to pass therethrough. An electric heater 41 is placed in the cavity 19. The base of the electric heater 41 is connected with a copper plate 43 with a small area. The top section of the electric heater 41 is connected with another copper plate 42 with a large area. The two copper plates 42, 43 are connected to the positive and negative electrodes of the cell 44 to form a complete circuit.

Figure 4:
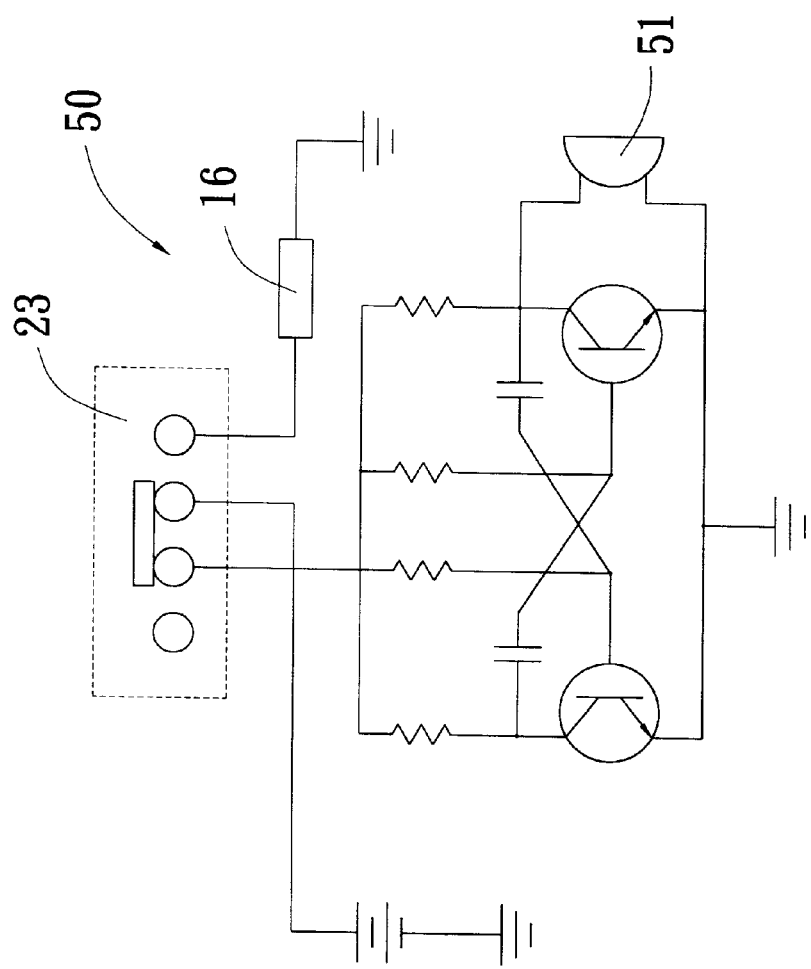
FIG. 4 is a circuit diagram of the present invention.
Figure 5:
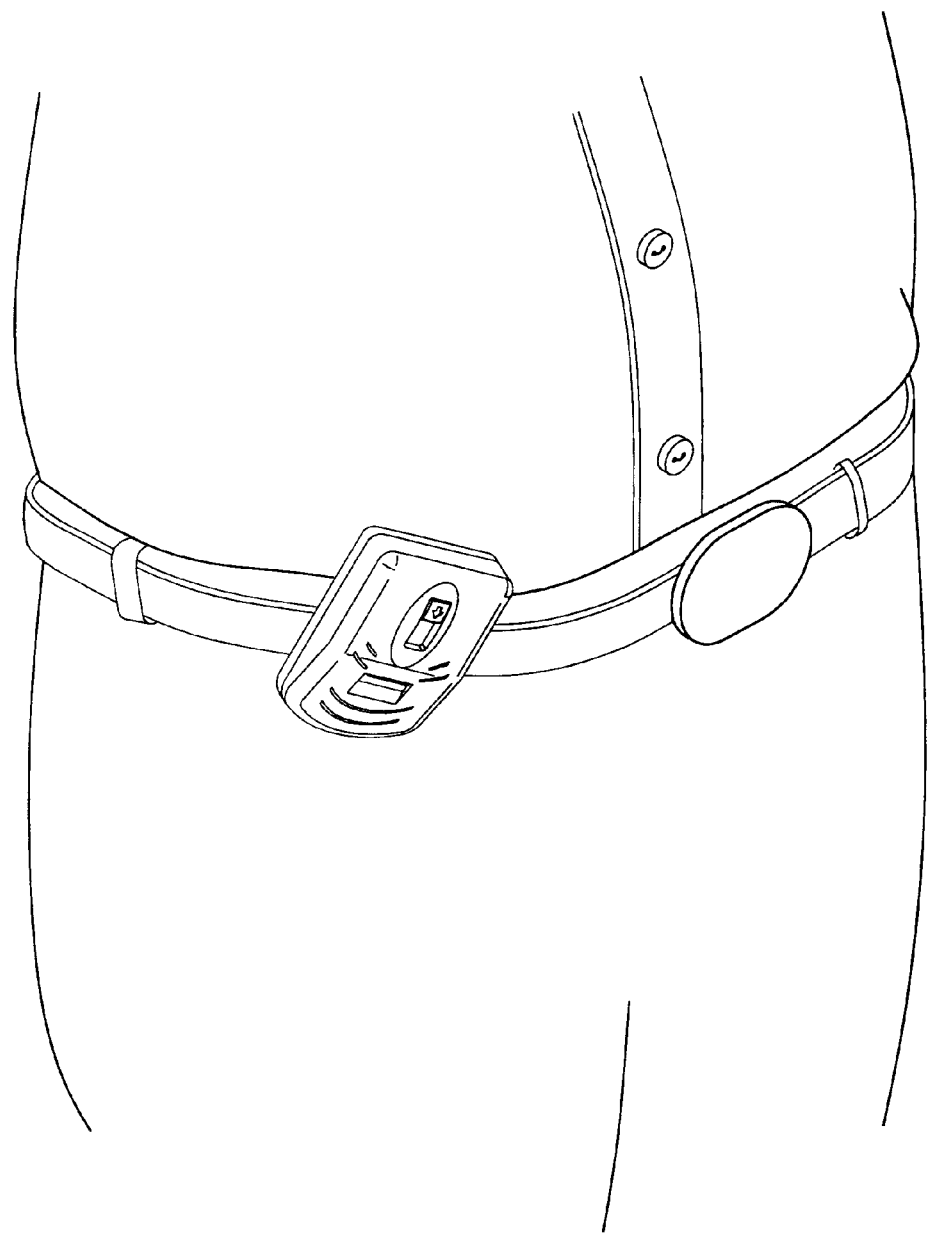
FIG. 5 shows the application of the present invention.

Referring to FIG. 5, when used outdoors, the present invention can be used with two options in accordance with the conditions:

1*a*. The switch 24 is shifted to a first stage to close the oscillating circuit 50 which is a secondary amplifying circuit composed of four resistors R1, R2, R3, R4, two capacitors C1, C2, two transistors Q1, Q2 and a buzzer B2 51. By means of supplying d-c power, the first output is sent to the secondary and a part of the secondary amplified output is fed back to the first and the other part of the output drives the buzzer 51. At this time, the buzzer 51 generates a sound wave for expelling the mosquitoes as shown in FIG. 4. 2*a*. The switch 24 is shifted to the second stage whereby the electric heater 41 is heated. At this time, an electric mosquito incense mat 52 can be inserted into the insertion hole 11 to contact with the positive copper plate 42 of the electric heater 41. Under such circumstance, the electric mosquito incense mat 52 is heated to release the mosquito-killing incense from the gas releasing slots 12, 13 so as to kill the mosquitoes.

A color-changing paper can be attached to the index mark 22 of the pushing block 21. The color of the color-changing paper is varied with the change of the temperature so that a user can clearly know whether the electric mosquito incense device is activated. When the electric mosquito incense mat loses its effect, by means of the pushing plate, the mat is pushed downward out of the insertion hole 11 and a new one can be directly and conveniently inserted into the insertion hole 11.

According to the above arrangement, the present invention has double mosquito expelling/killing functions which are switchable to expel mosquitoes by way of sound wave or kill mosquitoes by electric mosquito incense.

The above embodiment is only used to illustrate the present invention, not intended to limit the scope thereof. Many modifications of the above embodiment can be made without departing from the spirit of the present invention.

What is claimed is:

1. A switchable mosquito expelling/killing device comprising a box body with a certain dimension, the box body being disposed with a pushing block, an insertion hole, gas releasing slots and a switch, an oscillating circuit and a heater fixing seat, an electric heater and a cell for supplying power being disposed in the box body, whereby by means of the switch, the mosquito expelling/killing device can be switched between a mosquito expeller using the oscillating circuit to generate a sound wave simulating a sound wave of male mosquitoes and an electric mosquito incense device using the electric heater to heat an electric mosquito incense mat.

2. The switchable mosquito expelling/killing device as claimed in claim 1, wherein the oscillating circuit is a secondary amplifying circuit composed of four resistors, two capacitors and two transistors, whereby the secondary output of the oscillating circuit drives a buzzer to generate the sound wave.

3. The switchable mosquito expelling/killing device as claimed in claim 1, wherein the heater fixing seat is made of bakelite, the heater fixing seat being a rectangular body, the center of the rectangular body being formed with a cavity and the four corners of the rectangular body being disposed with threaded holes.

4. The switchable mosquito expelling/killing device as claimed in claim 1, wherein the upper and lower ends of the electric heater are disposed with copper plates respectively connected to positive and negative electrodes of the cell.

5. The switchable mosquito expelling/killing device as claimed in claim 4, wherein the electric heater is perpendicular to the insertion hole.

6. The switchable mosquito expelling/killing device as claimed in claim 1, wherein a center of a back face of the box body is disposed with an insertion slot in which a back clip is inserted.

7. The switchable mosquito expelling/killing device as claimed in claim 1, wherein a color-changing paper is attached to the pushing block, the color of the color-changing paper being varied with the change of temperature.

\* \* \* \* \*

UNITED STATES PATENT AND TRADEMARK OFFICE
CERTIFICATE OF CORRECTION

PATENT NO. : 6,293,044 B1
DATED : September 25, 2001
INVENTOR(S) : Feng

Page 1 of 1

It is certified that error appears in the above-identified patent and that said Letters Patent is hereby corrected as shown below:

Column 2,
Line 54, after "addition" -- , -- should be inserted.
Line 55, both occurrences of "threaded" should be -- thread --.
Line 59, "bakelkite" should be -- bakelite --.
Line 62, "threaded" should be -- thread --.

Column 4,
Line 27, "the" should be deleted.

Signed and Sealed this

Thirtieth Day of April, 2002

Attest:

Attesting Officer

JAMES E. ROGAN
Director of the United States Patent and Trademark Office